(12) United States Patent
Jolly et al.

(10) Patent No.: US 9,225,418 B2
(45) Date of Patent: Dec. 29, 2015

(54) DEVICE FOR MEASUREMENT OF THE PROFILE OF VERY SHORT DURATION SINGLE PULSES

(75) Inventors: Alain Jolly, Andernos (FR); Arnaud Mussot, Lille (FR)

(73) Assignee: COMMISSARIAT A L'ENERGIE ATOMIQUE, Paris (FR)

( * ) Notice: Subject to any disclaimer, the term of this patent is extended or adjusted under 35 U.S.C. 154(b) by 2359 days.

(21) Appl. No.: 12/085,106

(22) PCT Filed: Nov. 14, 2006

(86) PCT No.: PCT/EP2006/068455
§ 371 (c)(1),
(2), (4) Date: May 16, 2008

(87) PCT Pub. No.: WO2007/057394
PCT Pub. Date: May 24, 2007

(65) Prior Publication Data
US 2014/0341565 A1  Nov. 20, 2014

(30) Foreign Application Priority Data

Nov. 15, 2005 (FR) ..................................... 05 53467

(51) Int. Cl.
*H04B 10/079* (2013.01)
*G01J 11/00* (2006.01)
(52) U.S. Cl.
CPC ............. *H04B 10/0795* (2013.01); *G01J 11/00* (2013.01)
(58) Field of Classification Search
CPC .............................. G01J 11/00; H04B 10/0795
See application file for complete search history.

(56) References Cited

U.S. PATENT DOCUMENTS

| 5,555,119 A * | 9/1996 | Lewis ........................... 398/161 |
| 2002/0139924 A1* | 10/2002 | Otani et al. .................... 250/225 |
| 2003/0043366 A1* | 3/2003 | Ohta et al. ..................... 356/121 |

(Continued)

FOREIGN PATENT DOCUMENTS

FR  2 872 279 A1  12/2005

OTHER PUBLICATIONS

PCT Search Report in PCT/EP2006/068455 dated Apr. 1, 2007 by Dimitrios Varelas, European Patent Office, Rijswijk Netherlands.

(Continued)

*Primary Examiner* — Nathan Curs
(74) *Attorney, Agent, or Firm* — Nixon Peabody LLP (57) ABSTRACT

The invention relates to a device for measuring the profile of a single pulse or a pulse with a very low repetition rate, comprising
replication means (100,105,120,125,130) for generating a series of replica pulses of an initial optical pulse (I), with a recurrence period ($\tau$);
means (100b,150) for extracting said replica pulses;
optical sampling means (160,161) for sampling the extracted replica pulses (Ri) to output optical samples (Ei) from the extracted replica pulses (Ri) with a sampling period (Te), the deviation between the sampling period and the recurrence period being chosen to be not equal to zero and very much less than the recurrence period;
detection means (180) for obtaining an electrical signal from optical samples (Ei) output by said optical sampling means (160,161);
said replication means comprising parametric amplification means (120,140,141,142) for amplifying said replica pulses.

21 Claims, 8 Drawing Sheets

(56) References Cited

U.S. PATENT DOCUMENTS

2005/0168247 A1* 8/2005 Halvorson .................. 327/91
2008/0205883 A1* 8/2008 Jolly ............................ 398/16

OTHER PUBLICATIONS

Jonas Hansryd et al., "Fiber-Based Optical Parametric Amplifiers and Their Applications", IEEE Journal of Selected Topics in Quantum Electronics, IEEE Service Center, Piscataway, NJ, US, vo. 8, No. 3, May 2002, pp. 515-517.

Deng K-L et al., "Single-Shot Optical Sampling Oschilloscope for Ultrafast Optical Waveforms", IEEE Photonics Technology Letters, IEEE Service Center, Piscataway, NJ, US, vol. 10, No. 3, Mar. 1998, pp. 397-399.

Jolly et al., "Front-End Sources of the LIL-LMJ Fusion Lasers: Progress Report and Prospects", Optical Engineering Journal, vol. 42, No. 5, May 2003.

G.P. Agrawal, "Applications of Nonlinear Fiber Optics", Academic Press, 2001, 473 pages.

\* cited by examiner

DEVICE FOR MEASUREMENT OF THE PROFILE OF VERY SHORT DURATION SINGLE PULSES

CROSS REFERENCE TO RELATED APPLICATIONS OR PRIORITY CLAIM

This application is a national phase of International Application No. PCT/EP2006/068455, entitled "DEVICE FOR MEASURING VERY SHORT DURATION SINGLE-SHOT PULSE PROFILES", which was filed on Nov. 14, 2006, and which claims priority of French Patent Application No. 05 53467, filed Nov. 15, 2005.

TECHNICAL DOMAIN AND PRIOR ART

This invention relates to a device for measurement of the profile of very short duration single optical or electrical pulses.

The invention also relates to a device for measurement of the profile of optical or electrical pulses with a very low repetition rate.

The invention is applicable to the measurement of laser pulses with durations between a few picoseconds and a few tens of nanoseconds, in typical analogue frequency bands between 10 GHz and 300 GHz, taking account of the current technology of optical fibres and associated components.

The invention is also applicable to the measurement of single electrical pulses with durations between a few tens of picoseconds and a few tens of nanoseconds, in analogue frequency bands between 10 GHz and 100 GHz, taking account of the current technology of electro-optical modulators.

Measurement of the short duration single pulse profile is usually difficult and requires expensive instrumentation. Different types of instruments are used depending on the required performances, for example such as:

- single pulse sampling electrical oscilloscopes for pulses for which typical analogue frequency bands vary for example from 0 to 7 GHz (the <<Flash>> converter technology is then used),
- slit scan cameras (CBF cameras) for pulses for which analogue frequency bands (forming the signal spectrum) typically vary from a few GHz to 100 GHz (the technology used is the technology of vacuum electron tubes with a linearised lateral deflection to restore the time axis); slit scanning cameras are complex and expensive instruments that have to be frequently recalibrated, with a low optical sensitivity and a high sensitivity to disturbances from the environment,
- autocorrelators or devices based on processing of the spectral phase for pulses in coherent optics for which typical analogue frequency bands vary from a few hundred GHz to a few tens of THz (these instruments actually supply a relative measurement of the pulse duration, which is obtained based on assumptions about the shape of the profile); the technology is based on non-linear optics technology and involves a time/space conversion coupled with an image analysis and signal processing.

A measurement device used to very significantly extend analogue frequency bands of measured pulses has already been the subject of unpublished French patent application No 04 51277 filed on 15 Jun. 2004 in the name of the present applicant.

The device according to the invention can achieve these objectives while also improving the measurement dynamics due to a significantly reduced noise factor.

PRESENTATION OF THE INVENTION

The invention is defined by a device for measuring the profile of a single optical pulse or a pulse with a low repetition rate, comprising:

- replication means (100,105,120,125,130) for generating a series of replica pulses of an initial optical pulse (I), with a recurrence period ($\tau$);
- means (100b,150) for extracting said replica pulses;
- optical sampling means (160,161) for sampling the extracted replica pulses (Ri) to output optical samples (Ei) using the extracted replica pulses (Ri) with a sampling period (Te), the deviation between the sampling period and the recurrence period being chosen to be not equal to zero and very much less than the recurrence period;
- detection means (180) for obtaining an electrical signal from optical samples (Ei) output by said optical sampling means (160,161);
- said replication means comprising parametric amplification means (120,140,141,142) for amplifying said replica pulses.

The invention also relates to a device for measuring the profile of a single electrical pulse or a pulse with a low repetition rate comprising an electro-optical modulator in series with such a device for measuring the profile of an optical pulse.

In both cases, the very low noise ratio of the parametric amplification means is sufficient to achieve a particularly high measurement dynamics.

Other characteristics and advantages of the invention will become clear after reading a preferred embodiment of the invention with reference to the attached figures among which:

BRIEF DESCRIPTION OF THE FIGURES

In the figures.

The same reference numbers are used on all figures to represent the same elements.

DETAILED DESCRIPTION OF EMBODIMENTS OF THE INVENTION

Figure 1:
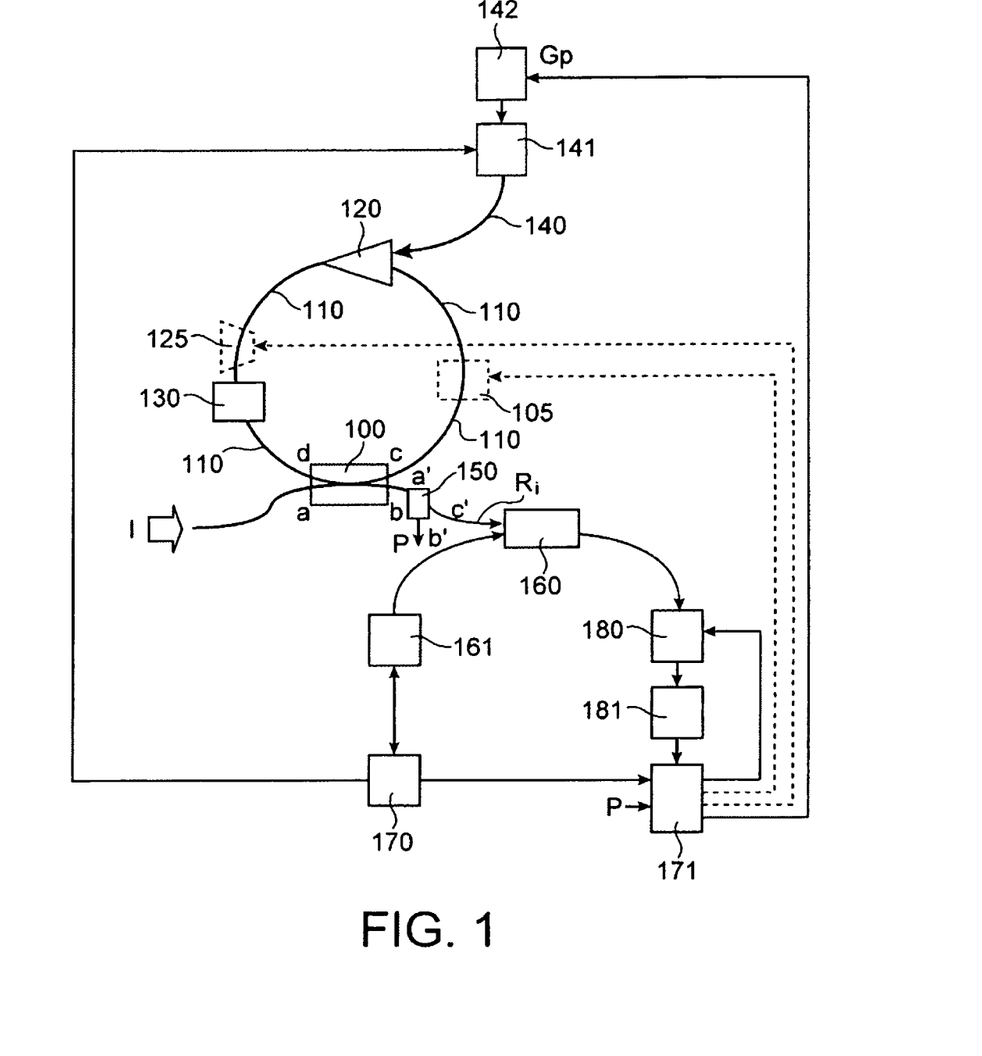
FIG. 1 shows a device for measurement of a single optical pulse according to the invention.

FIG. 1 shows a device for measuring an optical pulse according to one embodiment of the invention.

The device comprises an optical coupler with four ports 100, a single mode optic fibre 110 comprising a plurality of segments, a parametric amplifier 120 that can itself be composed of one or several fibre segments, an optical filter 130, the above-mentioned elements being arranged in loops.

The four ports of the coupler 100 are denoted a, b, c and d. Port a is the input to the device and receives the laser pulse to be measured, port b is connected to the input to an optical coupler with three ports 150, port c is connected to the input to the parametric amplifier through a first segment of the fibre 110, and port d is connected to the output from the optical filter through a second segment of the fibre 110.

The parametric amplifier 120 is pumped by a pump wave generated by a laser source 142, said pump laser of the parametric amplifier, output to said amplifier through a time shaping device 141 and an optical transfer fibre 140. The output from the parametric amplifier 120 is connected to the optical filter 130 through a third segment of the fibre 110.

Elements 105 and 125 shown in dashed lines, are optional and will be described later.

The three ports of the optical coupler 150 are denoted a', b' and c'. Port a' is connected to port b of coupler 100, port b' is connected to the control device 171, port c' is connected to an optical sampler 160, the connections being made using optical fibres.

The optical sampler 160 samples the signal output from port c' using an optical sampling signal output by a source 161. The source 161 generates recurrent laser pulses with very short duration. The sampler 160 as shown in FIG. 1 operates in <<transmission>> mode. However, a sampler operating in <<reflection>> mode could also be used alternatively.

The optical sampler 160, the time shaping device 141 and the control device 171 are clocked by an opto-electronic synchronisation device 170.

The optical signal output from the sampler 160 is converted into an electrical signal and is digitised by the converter 180. The digital samples produced by the converter are stored in the memory 181.

The control device 171 uses samples stored in memory and the signal sampled on port b' of the coupler 150 to determine the gain to be applied on the gain control of the converter 180 and/or the gain control of the pump laser of the parametric amplifier 142 and/or the optical attenuator 125 and/or the modulator 105.

The optical fibre 110 is of the single mode type to prevent mode dispersion effects from occurring, that would broaden in time pulse signals propagating in it.

The four-port coupler 100 is a directional coupler that operates as follows:
- a signal input to port a is transmitted such that a fraction $\alpha$ %, for example 50%, goes to port b and the remaining fraction $(1-\alpha)$%, for example 50%, goes to port c, and
- a signal that is input to port d is transmitted such that a fraction of $\alpha$ % goes to port b and the remaining fraction $(1-\alpha)$% goes to port c.

The laser pulse I to be measured is input into the measurement device through port a of coupler 100 and is then split into a first pulse fraction ($\alpha$%) output to port b and a second pulse fraction (($1-\alpha$)%) output to port c. The first pulse fraction is directed towards the coupler while the second is looped back through the optical fibre 110, the parametric amplifier 120, the optical filter 130 onto port d of the coupler 100.

The laser pulse circulating in the loop is amplified as it passes through the parametric amplifier 120. The principle of parametric amplification is known to those skilled in the art and a description of it can be found, for example, in the work by G. P. Agrawal entitled <<Applications of non-linear fibre optics>> published by Academic Press. It should be noted that parametric amplification is a non-linear process for exchange of energy between optical waves, based on the optical Kerr effect, with no energy exchange with the propagation medium. Schematically, when a pump wave (of high power) with frequency $\omega_1$ and an optical signal (of low intensity) with frequency $\omega_2$ are mixed in the same medium with some non-linear characteristics, the pump and signal waves generate a beat at frequency $\Delta\omega=\omega_2-\omega_1$. This modulation of the light intensity I generates a grating with index $n=n_0+n_1.I$ by the Kerr optical effect, diffracting the pump wave on the different frequency orders $\omega_1 \pm p.\Delta\omega$ where p is a non-zero integer. The $-1$ order corresponds to frequency $\omega_1$ and coherent amplification of the signal while the $+1$ order corresponds to generation of a third wave called the <<idler>> with frequency $2\omega_1-\omega_2$.

In order to obtain optimum energy transfer from the parametric amplifier pump to the signal, the linear phase shift induced by dispersion of the fibre must be compensated for the non-linear phase shift induced by the Kerr optical effect. If the parametric amplifier is made using an optical fibre, the amplification gain depends on the spectral pump-signal deviation, the length and the non-linearity of the fibre and the power of the pump. When the parametric amplifier is made using a single fibre segment choosing a pump wave length close to the zero dispersion wave length of the fibre, there will be a spectrally very wide gain band.

Figure 2:
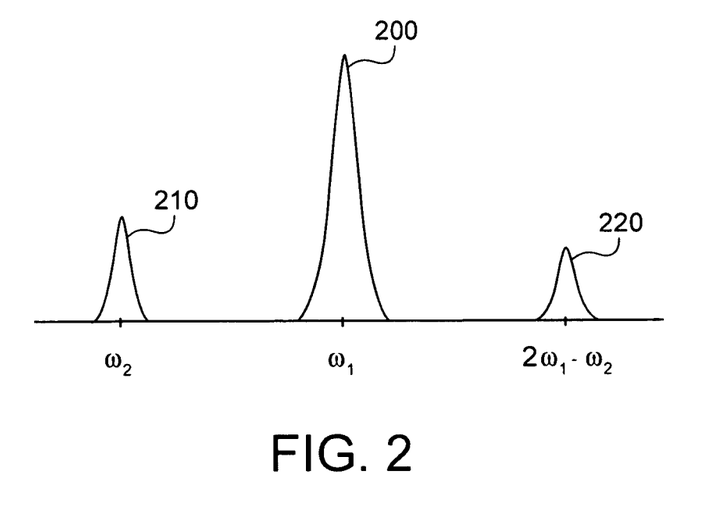
FIG. 2 shows the spectrum of the light signal output from the parametric amplifier used in the device in FIG. 1.

FIG. 2 shows the spectrum of the light signal output from the parametric amplifier. A distinction is made between spectral envelopes of the pump 200, the amplified signal 210 and the <<idler>> 220. The signal and <<idler>> waves are amplified as they are propagated with the pump wave, taking the corresponding energy from the pump wave.

The parametric amplifier may be made using a non-linear optical crystal in a manner known as such, or as has already been mentioned, more simply using an optical fibre segment. This amplifier architecture is commonly called FOPA (Fibre Optical Parametric Amplifier). In this case, the parametric amplification may advantageously be used performed on a segment of the fibre 110.

The function of the optical filter 130 is to eliminate the pump wave and the <<idler>> wave for each loop turn such that these waves no longer interact with the signal wave beyond the filter. The optical filter transmission is selected to be zero or minimum outside a spectral zone centred around the central frequency $\omega_2$ of the signal.

Furthermore, the synchronisation device 170 is adapted to provide a triggering signal to the device 141 with a recurrence period equal to the propagation time r of the loop and with phase adjusted such that the pump pulse output by the device 141 is synchronised with the pass of the laser pulse to be measured in the parametric amplifier.

The result is that amplification conditions are reinitialised and are perfectly stable in each loop turn, the gain of the loop depending only on the power of the pump and the copropagation distance of the pulse to be measured, and the pump pulse.

The time shaping device 141 advantageously comprises an electronic shaping signal generator and an electro-optical modulator modulating the intensity of the pump wave using said signal. The shape of the modulation signal is determined to compensate for distortions induced by the electro-optical modulator, such that the pump pulse injected into the fibre 140 is a very flat topped pulse. The width of the pump pulse is chosen to begin before the laser pulse to be measured is input into the parametric amplifier and to terminate after it has been output from it. In any case, the width of the pump pulse is chosen to be less than the loop propagation time. The shaping signal generator may be made using a filter comprising a series of lines coupled by AsGa FET transistors, the length of the lines and the voltages on the gates of the FETs defining the pulse response of the filter. One example embodiment of such a filter has been described in the article entitled <<Front-End Sources of the LIL-LMJ Fusion Lasers: Progress Report and Prospects>> by A. Jolly et al. published in Optical Engineering Journal, Vol. 42 No. 5, May 2003. According to another embodiment, the shaping device 141 does not include a pre-distortion filter but rather an optical device operating in saturation mode, located at the output from the electro-optical modulator.

The parametric amplifier pump laser is chosen to be single-mode and very stable in time and with a very low noise, to achieve efficient pumping.

The above-mentioned characteristics of the parametric amplifier pump laser and the time shaping device ensure a constant amplification gain for the time during which the pulse to be measured passes in the amplifier and uniform in its spectral band, thus preventing distortion of said pulse during each turn of the loop.

The use of a parametric amplification, for example instead of a stimulated amplification as described in the above-mentioned patent application, is an essential feature of this invention. Unlike an amplifier with stimulated amplification that would amplify fluorescence noise in each loop turn (ASE (Amplified Spontaneous Emission) noise) with a relatively high value that would thus quickly degrade the signal to noise ratio during successive replications, the noise ratio of the parametric amplifier is close to 3 dB if the pump is not noisy in itself, the power levels of its intrinsic noise due to parametric fluorescence being very much lower than those for the ASE noise.

Furthermore, since the parametric amplification gain is zero (0 dB) when the pump power is zero, any noise present outside the pump pulse will be attenuated. Thus, a loop gain of more than 1 can be achieved with no risk of amplification of a parasite laser signal.

The parametric amplification gain is determined essentially by the intensity of the pump pulse and the copropagation distance. Optionally, an optical attenuator 125 may be placed in the loop to enable fine adjustment of losses and therefore the gain of the loop. Typically, the attenuation may be adjusted within a range varying from a few dB to 15 dB. However as we will see later, it is not necessary to obtain a loop gain of approximately 0 dB, but rather the lowest possible value is preferred. The adjustment of the gain (attenuation) of the optical attenuator 125 is designed to give a fine compensation for this slow drift of the pump laser power of the parametric amplifier.

An optical pulse called the initial optical pulse for which the profile is to be measured, is injected in the measurement device through the port a of the coupler 100. It is divided into a first pulse fraction ($\alpha$ %) on port b, and a second pulse fraction (($1-\alpha$)%) on port c. Conventionally, this second pulse fraction is referred to as an order 0 replica. This replica is amplified by the parametric amplifier 120 as we have seen above, possibly attenuated by the attenuator 125, then filtered by the optical filter 130 before entering into port d of the coupler 100.

When it penetrates into port d, the second pulse fraction is itself divided into a third pulse fraction ($\alpha$ %) output on port b, and a fourth pulse fraction (($1-\alpha$)%) called the first replica, that is looped back onto port d after having been amplified. In each loop turn, the coupler 100 transmits a fraction $\alpha$ % of the power that it receives from port d onto output port b and a fraction ($1-\alpha$)% onto port c.

Thus, the pulse to be measured also leads to a series of replica pulses of the initial pulse, these replicas being separated from each other by a recurrence period $\tau$, propagation time in the loop. The replica pulses are extracted at port b of the coupler 100.

The replica pulses thus extracted are transmitted to port a' of the optical coupler 150. A fraction of the pulses is sampled at port b', the remaining part being transmitted through port c' to the optical sampler 160 which samples them under the action of the laser pulses IL output by the laser pulse source 161. The function of the optical sampler that will be described in detail later, is to make it largely transparent to replica pulses under the effect of the laser pulses IL, and largely opaque without these pulses. The laser pulse source 161 is preferably a mode blocking source that outputs laser pulses with period $T_e$ and duration $T_{ML}$ very much lower than $\tau$ ($T_{ML} \ll \tau$).

Figure 3A:
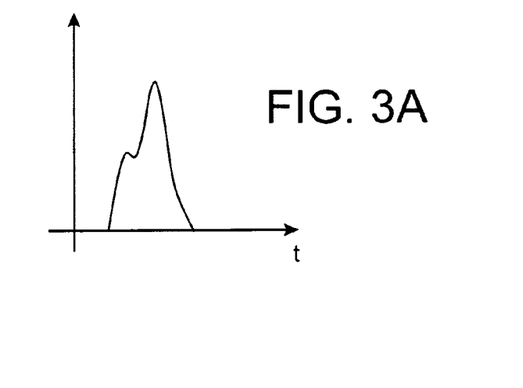
FIGS. 3A-3C show time diagrams illustrating operation of the measurement device in FIG. 1.
Figure 3B:
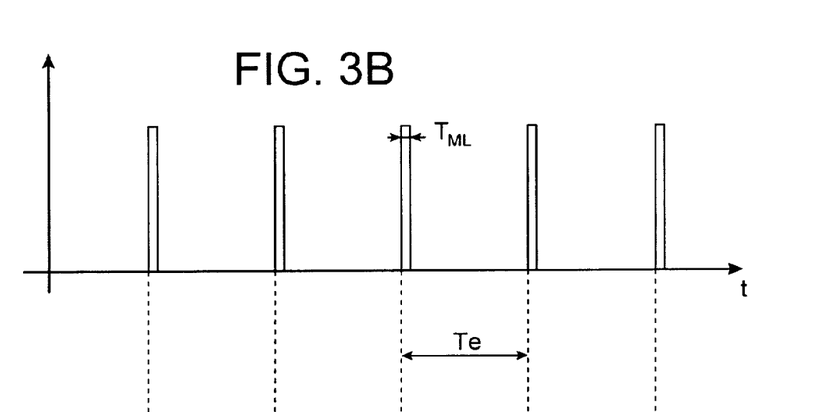
Figure 3C:
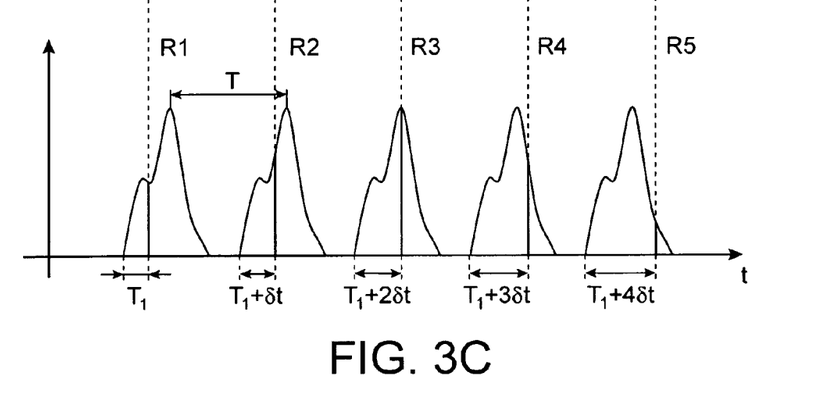

FIGS. 3A-3C show time diagrams that illustrate sampling of replica pulses.

FIG. 3A shows the optical pulse for which the profile is to be measured;

FIG. 3B shows pulses with width $T_{ML}$ and period Te that are output by the laser source 161;

The FIG. 3C shows a succession of replicas R1, R2, R3, . . . , RN, extracted from the replication loop and sampled based on the pulses shown in FIG. 3B. The first replica R1 is sampled at a first position in time $T_1$, the position in time $T_1$ measuring a duration separating an instant that marks the beginning of the replica R1 and the sampling instant. Replicas Ri with order i greater than 1 (i>1) are sampled at corresponding positions in time $T_1+(i-1)\delta t$ in which $\delta t=T_e-\tau$. Thus, the sampling instant progressively slides, by an increment $\delta t$ inside the profile of successive replicas. The quantity $\delta t$, i.e. the deviation between the sampling period, and the replica recurrence period, is chosen such that its absolute value is very much less than the duration of the pulse to be analysed, this duration itself being less than the recurrence period.

The maximum number of samples that can be acquired by the measurement device is $N=\tau/\delta t=1/((T_e/\tau)-1)$. For a pulse duration $\Delta T$ to be analysed, the measurement can be made at best after time $\tau.\Delta T/\delta t$. In other words, it would be possible to successively analyse successive pulses separated by $\tau.\Delta T/\delta t$, namely a maximum repetition ratio (ratio between pulse duration/time separating two successive pulses) equal to 1/N.

Samples Ei (i=1, 2, . . . , N) output by the optical sampler 160 are transmitted to the variable gain optical-electrical converter 180. This converter comprises a photodetector, for example a photodiode, followed by a variable gain analogue digital converter. The photodetector may for example operate in analogue frequency bands between 10 GHz and 60 GHz as is presently possible with telecommunication technologies, but will preferably remain in much narrower frequency bands (100 MHz to 1 GHz) for noise reduction needs. Therefore the optical/electrical conversion used in the photodetector can be done in integrator mode. Integrator mode consists of assimilating the amplitude of a given optical sample with the value integrated over time of the electrical response time of the photodetector. The only errors occurring, possibly to be corrected, are then errors resulting from saturation or desaturation effects of the photodetector, the offset of the base line induced by a successive electrical pulse stacking effect, etc. The electrical samples output by the photodetector are transmitted to the analogue-digital converter that digitises them at the frequency 1/$\tau$. For example, digitisation may be coded on 8 or 10 bits. The coding time is not critical. It is limited only by the value of τ. Digital data output by the analogue-digital converter are then transmitted to the buffer memory 181 for which the access time is less than τ.

The control device 171 receives a signal P sampled on replicas extracted from the loop and reads the numeric values of samples in the buffer memory. It controls the gain of the converter 180 and the pump laser power of the parametric amplifier 142. Optionally, the replication loop may comprise a fine adjustment optical attenuator 125, used to compensate the slow drift in the pump laser power of the parametric amplifier 142. Thus, the control device 171 applies a set level $G_P$ to the pump laser and corrects the slow drift of the effective pump power. Also optionally, the replication loop may comprise an electro-optical modulator 105 used to apply an optical gain (attenuation), variable in time, to the replica pulses circulating in the loop. In this case, the control device 171 also supplies the control signal to said modulator. The gain variation applied through the electro-optical modulator 105 is much faster (of the order of r) than that applied through the optical attenuator 125.

In a prior calibration phase, a pulse with a known shape and intensity, for example a time pulse, is injected into the input to the measurement device. The device 171 measures the power of the sampled signal P and analyses the corresponding samples stored in memory. It deduces the gain law to be applied to the optical-electrical converter 180 to compensate for the decay in the amplitude of samples over time. If an electro-optical loss modulator 105 is present, a gain law for the converter 180 and a gain law for the modulator 105 are deduced from it, and are combined to make said compensation.

Figure 4A:
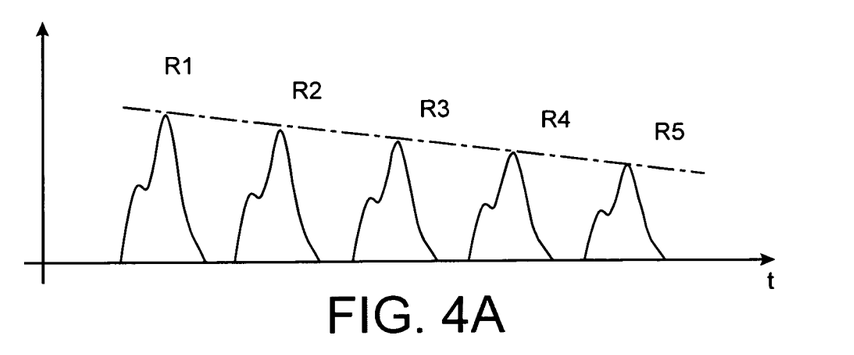
FIGS. 4A-4C show time diagrams illustrating how gain controls are used for the measurement device in FIG. 1.

FIG. 4A shows a stream of replicas Ri extracted from the replication loop. It can be seen that in this case the loop gain is less than 1, and the intensity of replicas decreases with time. However, the loop gain could also be more than 1 if the parametric amplification gain exceeded the attenuation applied in the other elements of the loop.

Figure 4B:
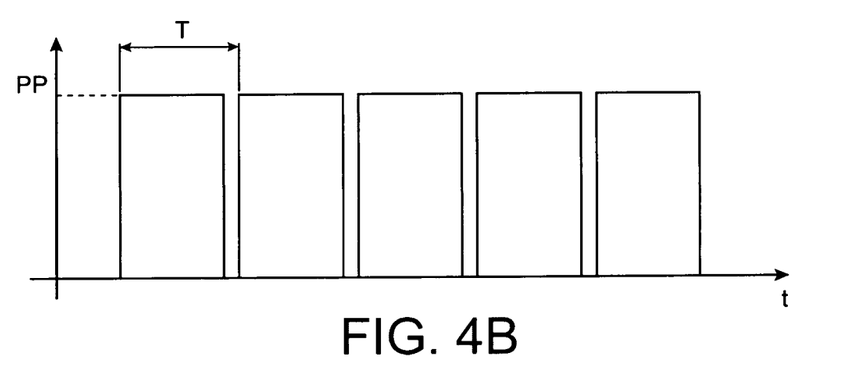

FIG. 4B shows the intensity of the parametric amplifier pump at the output from the time shaping device 141. The level PP of the plateau is kept stable by the control device 171 acting on the peak power of the parametric source through the gain control $G_P$.

Figure 4C:
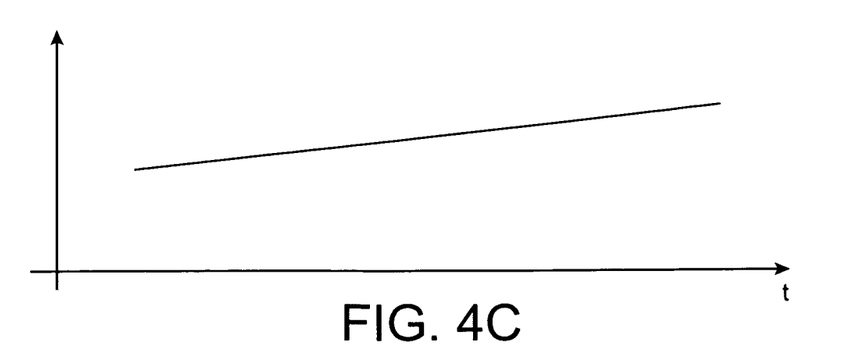

FIG. 4C shows the gain applied to the converter 180 as a function of time. The gain law was determined in the calibration phase to compensate for replica intensity variations. This enables operation at a maximum signal to noise ratio in the converter 180. When a loss modulator is used in the loop, a similar law may be applied on its modulation input, the combination of the two gain laws thus enabling compensation.

A rectangular optical pulse is advantageously used during the prior calibration phase. The digital values stored during this phase describe the intensity variation law to be compensated. According to one embodiment, the calibration is made periodically, for example during each loop turn. To achieve this, a calibrated rectangular shaped optical pulse is multiplexed in time at the input to the measurement device with the optical pulse for which the profile is to be measured. The duration of the former is chosen to be greater than the duration of the latter. The two pulses generate series of interlaced replicas. Replicas of the calibrated pulse and replicas of the pulse to be measured may be amplified by the same pump pulses or by distinct pump pulses, in which case the synchronisation device 170 triggers two pump pulses for each loop turn, through the time shaping device 141. Digital values related to samples of the calibrated pulse are then used after interpolation if necessary, to determine the gain to be applied to the converter 180 and/or to the modulator 105 during each loop turn.

Regardless of the type of calibration used, it will be seen that gain values only need to be applied at the replication rate 1/τ, at the most. Consequently, the control electronics can be made conventionally.

Figure 5:
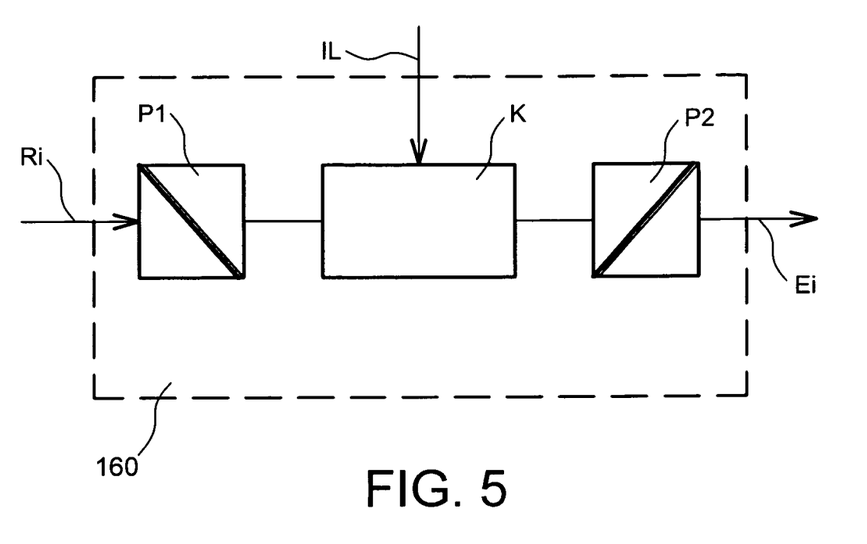
FIG. 5 shows a first variant embodiment of an optical sampler.

FIG. 5 shows a first embodiment of the optical sampler 160.

The optical sampler shown is a Kerr cell. The Kerr cell comprises an active medium with optical Kerr effect K that can be placed between two crossed polarisers P1, P2. During application of a laser pulse IL output by the source 161, the medium K presents sufficient transient birefringence to change the device from a non-conducting state (non-depolarising medium placed between two crossed polarisers) to a conducting state (transmission of the optical polarisation component in the plane of the output polariser).

The optical sampler in the form of a Kerr cell has an excellent resolution in time. It is possible to output optical samples with a width of the order of two hundred femtoseconds.

The active Kerr effect medium may for example be a $CS_2$ type liquid requiring conditioning in a sealed chamber. The active Kerr effect medium may also be a solid medium based on glass that then requires a greater laser intensity at the output from the source 161.

Figure 6:
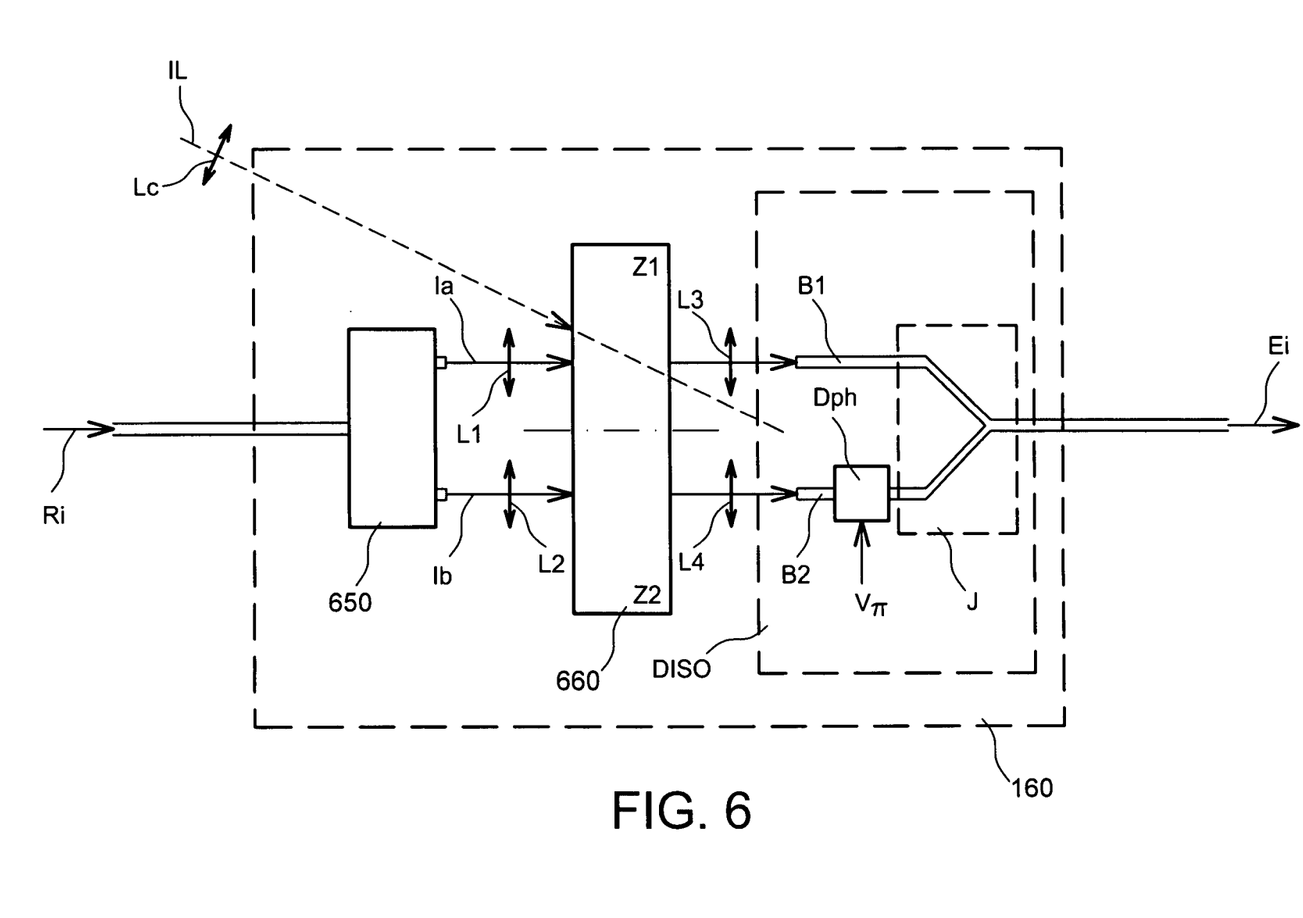
FIG. 6 shows a second variant embodiment of an optical sampler.

FIG. 6 shows a second embodiment of the optical sampler 160.

The sampler 160 then comprises a divider by two 650, a fast saturable absorbent 660, an optical interferometric subtraction device DISO and collimation lenses L1, L2, L3, L4. The interferometric optical subtraction device DISO comprises two input arms B1, B2, the arm B2 being provided with a phase shift Dph, and a recombination junction J with two inputs and one output. The sampler input and output are the input to the divider by two 650 and the output from the junction J respectively. The arms B1 and B2 and the junction J are made using any type of optical wave guide, for example optical fibres.

A replica pulse Ri received at the input to the sampler 160 is divided into a first pulse fraction Ia and into a second pulse faction Ib with amplitude approximately identical to the amplitude of the pulse fraction Ia. The first pulse fraction Ia is transmitted to a first zone Z1 of the saturable absorbent through a first collimation lens L1 and the second pulse fraction Ib is transmitted to a second zone Z2 of the saturable absorbent through a second collimation lens L2.

The operation of a saturable absorbent is based on the absorption saturation phenomenon. Low intensity signals that pass through a saturable absorbent are subject to intrinsic absorption of the absorbent medium and are consequently partially absorbed. On the other hand, high intensity signals whiten the absorbent medium through which they pass until its absorption is reduced to a value significantly lower than the initial absorption value. High intensity signals can then be transmitted partially.

Mathematically, the transfer characteristic of a saturable absorbent is expressed by the following relation:

$$A(\Phi) = \frac{A_o}{1 + \frac{\Phi}{\Phi_{sat}}},$$

where
- A(Φ) is the absorption coefficient of the absorbent as a function of the intensity Φ of the signal that illuminates the absorbent,
- Ao is the attenuation coefficient of the absorbent in the absence of illumination, and
- $\Phi_{sat}$ is the specific saturation intensity of the absorbent (W/cm²).

In the context of the invention, the zone Z1 is illuminated by pulse fractions Ia and by pulses IL, while the zone Z2 is illuminated by pulse fractions Ib only. The peak power $P_{ML}$ of pulses IL output from the mode blocking laser source 161 is chosen to saturate the transmission of the absorbent entirely, or at least very significantly, during durations $T_{ML}$. The beam of pulses IL and the beam of pulse fractions Ia are not co-linear. The beam of pulses IL is collimated on the saturable absorbent zone Z1 through a collimation lens Lc, along an axis offset by a few degrees to a few tens of degrees from the axis along which the beam of pulse fractions Ia is collimated. The signal collected at the output from zone Z1 and that is collimated through the collimation lens L3 on the input to arm B1, is then composed only of pulse fractions Ia that have passed through the zone Z1.

For a pulse fraction Ia that penetrates into zone Z1, zone Z1 behaves like a sampling gate that works at the frequency $F_e$ of the mode blocking laser source ($F_e=1/T_e$). The opening time $T_{ech}$ of the sampling gate is approximately equal to the overlap time $T_{sat}$ of the saturable absorbent. The duration of the overlap time $T_{sat}$ is longer than the pulse time $T_{ML}$. The sampling increment of the measurement device δt, must be chosen to be greater than or equal to $T_{sat}$ so as to have no overlap between successive samples.

The saturable absorbent according to the invention may be made using several different technologies. A liquid solution based on dyes in a solid matrix may be envisaged, or a solid saturable absorbent based on carbon nano-tubes or semiconductors (SESAM) could be used. Solid absorbents of this type are the fastest at the moment with overlap times $T_{sat}$ of the order of 1 picosecond. Spectrally, the saturable absorbent is also chosen, preferably, to be compatible with optical operation in the near infrared that is a useful frequency band for Neodymium, Ytterbium or Erbium based lasers.

While zone Z1 behaves like a sampling gate, zone Z2 has absorption with coefficient Ao. The signal output by zone Z2 is transmitted through the collimation lens L4 to the input to arm B2.

Figure 7A:
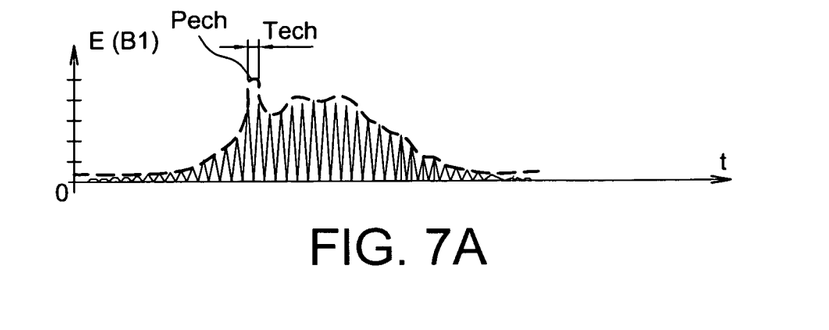
FIGS. 7A-7C show time diagrams illustrating operation of the circuit shown in FIG. 6.
Figure 7B:
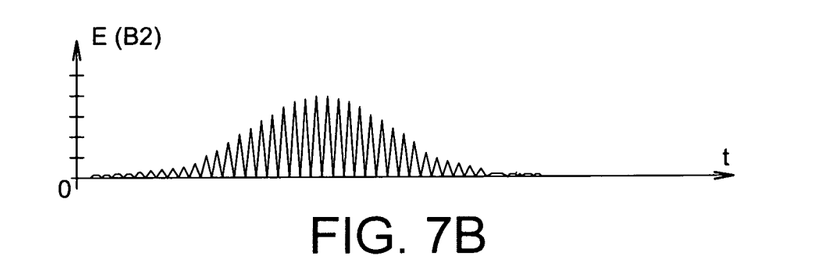

FIG. 7A shows the sampled signal E(B1) collected at the output from zone Z1 and FIG. 7B shows the signal E(B2) collected at the output from zone Z2. The signal E(B1) shows a sampling peak $P_{ech}$ with width $T_{ech}$ within a signal that reproduces and attenuates the pulse fraction Ia. signal E(B2) reproduces and attenuates the pulse fraction Ib.

Figure 7C:
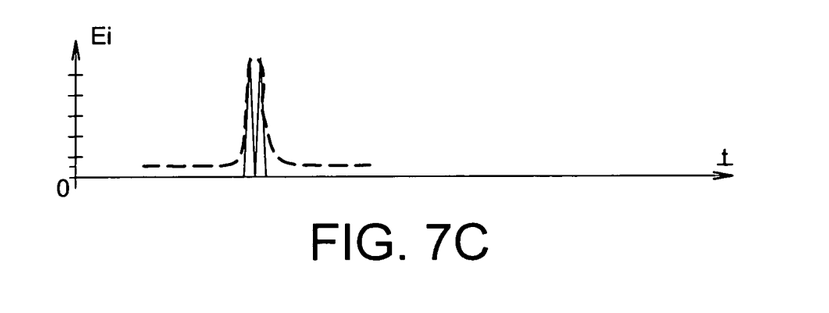

The arm B2 is fitted with a voltage controlled phase shifter Dph. The voltage $V_\pi$ applied to the phase shifter Dph is adjusted such that the optical signal produced at the output of arm B1 is in phase opposition with the signal output from arm B2. The junction J that summates signals output by arms B1 and B2 then outputs a sample Ei with width $T_{ech}$, shown in FIG. 7C.

Figure 8:
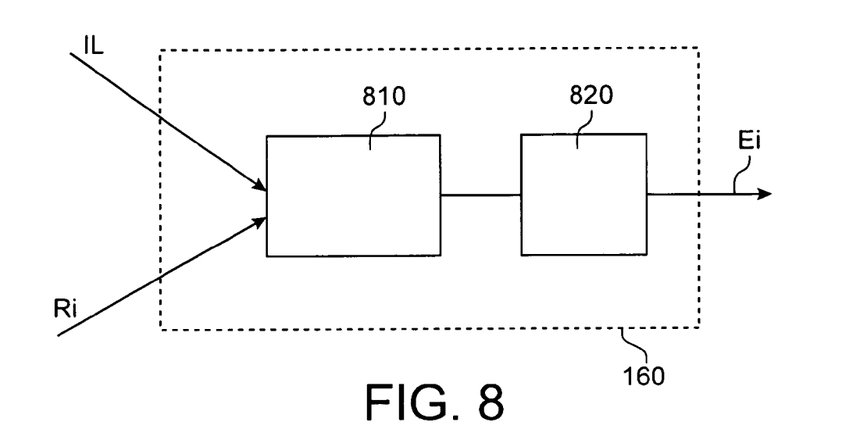
FIG. 8 shows a third variant embodiment of an optical sampler.

FIG. 8 diagrammatically shows a third embodiment of the optical sampler 160.

The optical sampler comprises a non-linear optical crystal 810, for example a KDP crystal, mixing pulses IL from the blocked modes laser 161 and replicas Ri extracted from the replication loop. Let $\omega_{IL}$ and $\omega_2$ be the corresponding optical frequencies of the laser 161 and the laser pulse for which the profile is to be measured. The non-linear crystal generates an optical signal at frequency $\omega_{IL}+\omega_2$ with a power proportional to $P_{IL}.P2$, where $I_{IL}$ and P2 are the instantaneous powers of the sampling signal and the replica pulse respectively. This optical signal is isolated by means of an optical filter 820 with a transfer function centred around the $\omega_{IL}+\omega_2$ frequency and rejecting frequencies $\omega_{IL}$ and $\omega_2$. When the power of the sampling signal is zero, the power of the signal at the filter output is practically zero, and when a pulse IL is present, the power of the output signal is proportional to the instantaneous power of the replica pulse.

Figure 9:
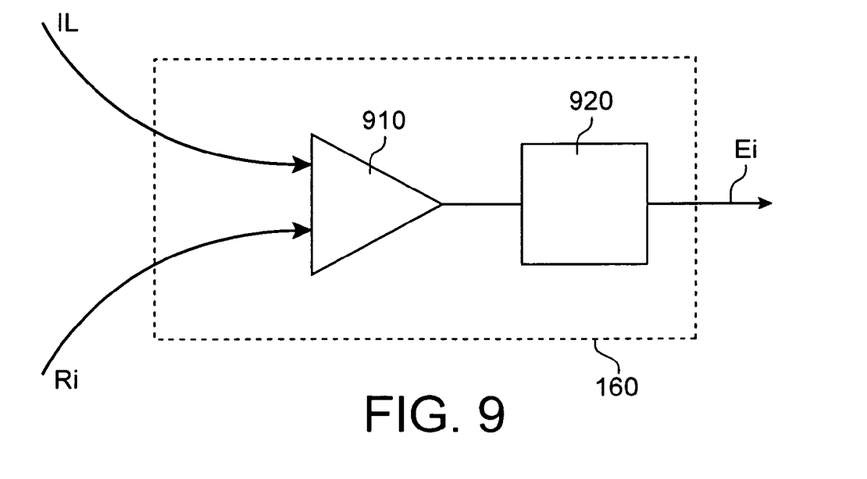
FIG. 9 shows a fourth variant embodiment of an optical sampler.

FIG. 9 shows a fourth embodiment of the optical sampler 160.

The sampler comprises a low gain parametric amplifier 910 made from a non-linear crystal or an optical fibre segment (FOPA). The amplifier is pumped by pulses IL of the laser 161, that must be stable and only slightly noisy. During pumping, the replica pulse Ri is amplified and a corresponding "idler" signal occurs proportional to the pump power and to the instantaneous power of the replica pulse. A passband filter 920 centred on the frequency $2\omega_{IL}-\omega_2$ of the "idler" signal and rejecting the amplified replica signal and the pump residue, is placed at the output from the parametric amplifier. The output signal from the filter only appears in the presence of a sampling pulse IL and its power is proportional to the instantaneous power of the replica pulse.

Advantageously, the invention is applicable not only to optical pulses but also to electrical pulses. In this case, it is sufficient to convert the electrical pulse to be measured into an optical pulse. An electro-optical modulator is then placed on the port a of the coupler 100 to achieve this conversion. The electro-optical modulator may be a modulator with direct or indirect modulation. In the latter case, which is the case that enables the largest pass bands, the modulator is powered at its input by a continuous stable low power laser source. In the case of a direct modulation, the modulator may for example be a diode. However in the case of the measurement of electrical pulses, some degradation of frequency performances will have to be considered, the transfer function of the electro-optical modulator acting as a limitative factor in dynamic and analogue pass band terms of the device. On the other hand, the sampling time resolution is maintained.

For example, the electro-optical modulator may be a modulator using electro-absorbent or polymer technologies, or a progressive waves modulator.

The invention claimed is:

1. Device for measuring the profile of a single optical pulse or an optical pulse with a low repetition rate, characterised in that it comprises:
   - replication means for generating a series of replica pulses of an initial optical pulse, with a recurrence period;
   - means for extracting said replica pulses;
   - optical sampling means for sampling the extracted replica pulses to output optical samples from the extracted replica pulses with a sampling period, the deviation between the sampling period and the recurrence period being chosen to be not equal to zero and less than the recurrence period;
   - detection means for obtaining an electrical signal from optical samples output by said optical sampling means;
   - said replication means comprising parametric amplification means for amplifying said replica pulses.

2. Device according to claim 1, characterised in that said replication means comprise an optical loop comprising a plurality of optical fibre segments.

3. Device according to claim 2, characterised in that said parametric amplification means comprise at least one optical fibre segment, a parametric pump laser and time shaping means receiving a pump wave from said laser and outputting a pump pulse to said optical fibre segment.

4. Device according to claim 3, characterised in that time shaping means are capable of outputting a pump pulse with a very flat pulse and low noise.

5. Device according to claim 3, characterised in that it comprises synchronization means to synchronize the pump pulse with a replica pulse passing in the parametric amplification means.

6. Device according to claim 3, characterised in that said replication means also comprise an optical filter capable of filtering pump and idler signals at the output from said parametric amplification means.

7. Device according to claim 1, characterised in that said replication means comprise an optical attenuator at the output from said parametric amplification means.

8. Device according to claim 2, characterised in that the extraction means comprise a coupler with two input ports and two output ports, one input port and one output port being connected to said optical loop, the other input port receiving the initial optical pulse and the other output port outputting said extracted replica pulses.

9. Device according to claim 1, characterised in that the optical sampling means comprise a Kerr cell installed between two crossed polarizers.

10. Device according to claim 1, characterised in that the optical sampling means comprise a divider to divide a replica pulse into a first replica pulse fraction and a second replica pulse fraction, a saturable absorbent comprising a first zone and a second zone respectively illuminated by the first and the second replica pulse fractions, the first zone being made approximately transparent under the effect of an optical sampling signal and an optical interferometric subtraction device that outputs an optical sample as the result of the difference between a sampled signal output from the first zone and a signal output from the second zone.

11. Device according to claim 10, characterised in that the optical interferometric subtraction device comprises a first arm with an input to collect the sampled signal output from the first zone, a second arm to collect the signal output from the second zone, a voltage-controlled phase shifter, installed in series on the second arm, to set up a phase shift $\pi$ between the optical signal output from the first arm and the optical signal output from the second arm and a junction with two inputs and an output that collects the signal output from the first arm on a first input and the signal output from the second arm on a second input and that outputs optical samples on its output.

12. Device according to claim 10, characterised in that the saturable absorbent is a liquid solution comprising dyes.

13. Device according to claim 10, characterised in that the saturable absorbent comprises carbon nano-tubes.

14. Device according to claim 10, characterised in that the saturable absorbent is based on semiconductors.

15. Device according to claim 1, characterised in that the optical sampling means comprise a low gain parametric amplifier pumped by an optical sampling signal followed by an optical filter to isolate the idler signal at the output from said parametric amplifier, said optical samples being given by said idler signal.

16. Device according to claim 1, characterised in that it includes an optical-electrical converter comprising a photodetector followed by an analogue-digital converter, said converter thus converting optical samples into digital values.

17. Device according to claim 16, characterised in that said analogue-digital converter is a variable gain converter.

18. Device according to claim 17, characterised in that it comprises control means to control the gain of the parametric amplification means and the analogue-digital converter.

19. Device according to claim 18, characterised in that replication means also comprise a loss modulator, said control means controlling attenuation level in said loss modulator.

20. Device according to claim 18, characterised in that, in a calibration phase, an optical pulse is injected in the measurement device and control means determine the gain of the analogue-digital converter and/or the attenuation level of the loss modulator so as to maintain the value of the digital samples at a predetermined level.

21. Device for measuring of the profile of a single electrical pulse or an electrical pulse with a very low repetition rate, characterised in that it comprises an electro-optical modulator in series with a device for measuring the profile of an optical pulse according to claim 1.

* * * * *